US011797018B2

(12) United States Patent
He et al.

(10) Patent No.: US 11,797,018 B2
(45) Date of Patent: Oct. 24, 2023

(54) CLEANING ROBOT AND CONTROL METHOD THEREFOR

(71) Applicants: BEIJING XIAOMI MOBILE SOFTWARE CO., LTD., Beijing (CN); BEIJING ROBOROCK TECHNOLOGY CO., LTD., Beijing (CN)

(72) Inventors: Hang He, Beijing (CN); Haojian Xie, Beijing (CN); Yongfeng Xia, Beijing (CN)

(73) Assignees: BEIJING XIAOMI MOBILE SOFTWARE CO., LTD., Beijing (CN); BEIJING ROBOROCK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/661,044

(22) Filed: Apr. 27, 2022

(65) Prior Publication Data
US 2022/0253064 A1 Aug. 11, 2022

Related U.S. Application Data

(63) Continuation of application No. 16/283,013, filed on Feb. 22, 2019, now Pat. No. 11,340,626, which is a (Continued)

(30) Foreign Application Priority Data
Aug. 23, 2016 (CN) .......................... 201610708772.X

(51) Int. Cl.
G05D 1/02 (2020.01)
A47L 11/40 (2006.01)
A47L 11/24 (2006.01)

(52) U.S. Cl.
CPC ............ *G05D 1/0225* (2013.01); *A47L 11/24* (2013.01); *A47L 11/40* (2013.01); *A47L 11/4011* (2013.01);
(Continued)

(58) Field of Classification Search
CPC ............... G05D 1/0225; G05D 1/0274; G05D 2201/0215; A47L 11/24; A47L 11/40; A47L 11/4011; A47L 2201/04
See application file for complete search history.

(56) References Cited

U.S. PATENT DOCUMENTS

2004/0158357 A1* 8/2004 Lee ...................... G05D 1/0225
700/258
2007/0244610 A1* 10/2007 Ozick ...................... A47L 11/24
342/417

(Continued)

FOREIGN PATENT DOCUMENTS

CN 103349531 A * 10/2013

*Primary Examiner* — Jeff A Burke
*Assistant Examiner* — Joshua Alexander Garza
(74) *Attorney, Agent, or Firm* — SYNCODA LLC; Feng Ma

(57) ABSTRACT

A method of controlling a cleaning robot includes: acquiring a marked position of a charging station in a map; controlling the cleaning robot to travel to a front position of the marked position and identifying the charging station; when the charging station is not identified, generating a finding path based on the marked position; and controlling the cleaning robot to travel in accordance with the finding path and identifying the charging station in a traveling process.

17 Claims, 10 Drawing Sheets

Related U.S. Application Data continuation of application No. PCT/CN2017/083116, filed on May 4, 2017.

(52) U.S. Cl.
CPC ........ *G05D 1/0274* (2013.01); *A47L 2201/04* (2013.01); *G05D 2201/0215* (2013.01)

(56) References Cited

U.S. PATENT DOCUMENTS

| | | | |
|---|---|---|---|
| 2012/0265391 A1* | 10/2012 | Letsky | G05D 1/0088 701/25 |
| 2012/0323365 A1* | 12/2012 | Taylor | G05D 1/0242 901/1 |
| 2014/0100693 A1* | 4/2014 | Fong | B25J 11/0085 700/253 |
| 2015/0115876 A1* | 4/2015 | Noh | H02J 7/0042 320/107 |
| 2016/0091899 A1* | 3/2016 | Aldred | B60L 53/14 901/1 |
| 2017/0102709 A1* | 4/2017 | Kwak | A47L 9/2805 |
| 2018/0246518 A1* | 8/2018 | Vogel | G05D 1/0234 |

* cited by examiner

CLEANING ROBOT AND CONTROL METHOD THEREFOR

CROSS-REFERENCE TO RELATED APPLICATION

This application is a continuation of, and claims priority to, U.S. patent application Ser. No. 16/283,013 filed on Feb. 22, 2019, which is a continuation of, and claims priority to International Application No. PCT/CN2017/083116 filed on May 4, 2017, which claims priority to Chinese Patent Application No. 201610708772.X, filed on Aug. 23, 2016. The disclosures of these applications are hereby incorporated by reference in their entirety.

BACKGROUND

A cleaning robot can be configured to perform a cleaning operation while automatically traveling in a certain region to be cleaned without user interventions.

When starting to operate, the cleaning robot can perform the cleaning operation starting from a charging station, and draw a map. A position of the charging station can be marked in the map. When the cleaning operation is completed, or a power level of the cleaning robot is lower than a predetermined value, the cleaning robot returns to the charging station for being charged according to the position of the charging station marked in the map.

SUMMARY

The present disclosure relates to the field of smart home appliances, and more particularly, to a cleaning robot and related control method.

In an aspect, a cleaning robot is provided. The cleaning robot can include:

a controller;

an identifying device and a traveling driver electrically connected to the controller;

in which the controller is configured to:

acquire a marked position of a charging station in a map, the map being drawn by the cleaning robot;

control the cleaning robot to travel to a front position of the marked position and to identify the charging station;

generate a finding path based on the marked position when the charging station is not identified; and control the cleaning robot to travel according to the finding path and to identify the charging station during a traveling process.

In some embodiments, the controller is further configured to:

control the cleaning robot to travel a first distance along a first direction and to identify the charging station during the traveling process;

control the cleaning robot to return to the front position of the marked position when the charging station is not identified; and control the cleaning robot to travel a second distance along a second direction and to identify the charging station during the traveling process;

the first direction being opposite to the second direction.

In some embodiments, the controller is further configured to:

control the cleaning robot to travel along a first arc and to identify the charging station during the traveling process, the first arc being defined by taking a first position behind the marked position as a circle center and taking a distance between the first position and a second position as a radius, the first arc passing through both the front position and the second position;

control the cleaning robot to return to the front position of the marked position when the charging station is not identified; and control the cleaning robot to travel along a second arc and to identify the charging station during the traveling process, the second arc being defined by taking the first position behind the marked position as a circle center and taking a distance between the first position and a third position as a radius, the second arc passing through both the front position and the third position;

in which, the first position and the marked position are separated by a third distance, the second position is at a fourth distance from the marked position along the first direction, the third position is at a fifth distance from the marked position along the second direction, and the first direction is opposite to the second direction.

In some embodiments, the controller is further configured to:

control the cleaning robot to travel along a third arc and to identify the charging station during the traveling process, the third arc being defined by taking the marked position as a circle center and taking a first predetermined distance as a radius, the third arc passing through both a fourth position and a fifth position;

control the cleaning robot to return to the fifth position when the charging station is not identified; and control the cleaning robot to travel along a fourth arc and to identify the charging station during the traveling process, the fourth arc being defined by taking the marked position as a circle center and taking the first predetermined distance as a radius, the fourth arc passing through both the fifth position and a sixth position;

in which the first predetermined distance is determined according to a visible distance of the cleaning robot, the fourth position is at the first predetermined distance from the marked position along the first direction, the fifth position is at the first predetermined distance from the marked position in front of the marked position, the sixth position is at the first predetermined distance from the marked position along the second direction, and the first direction is opposite to the second direction.

In some embodiments, the controller is further configured to:

control the cleaning robot to travel to an arbitrary position of a fifth arc, the fifth arc being defined by taking a seventh position as a circle center and taking a first predetermined distance as a radius, the fifth arc passing through each of an eighth position, a ninth position and a tenth position;

control the cleaning robot to travel along the fifth arc and to identify the charging station during the traveling process;

control the cleaning robot to travel to an arbitrary position of a sixth arc when the charging station is not identified, the sixth arc being defined by taking an eleventh position as a circle center and by taking the first predetermined distance as a radius, the sixth arc passing through each of a twelfth position, a thirteenth position and a fourteenth position; and control the cleaning robot to travel along the sixth arc and to identify the charging station during the traveling process;

in which, the seventh position is at a second predetermined distance from the marked position along a first direction, the eighth position is at the first predetermined distance from the seventh position along the first direction, the ninth position is at the first predetermined distance from the seventh position along a second direction, the tenth position is at the first predetermined distance from the seventh position in front of the seventh position, the eleventh position is at the second predetermined distance from the marked position along the second direction, the twelfth position is at the first predetermined distance from the eleventh position along the first direction, the thirteenth position is at the first predetermined distance from the eleventh position along the second direction, the first predetermined distance is determined according to a visible distance of the cleaning robot, the second predetermined distance is determined according to a moveable distance of the cleaning robot, and the first direction is opposite to the second direction.

In some embodiments, the controller is further configured to:

control the cleaning robot to travel along a seventh arc and to identify the charging station during the traveling process;

in which the seventh arc is defined by taking the marked position as a circle center and by taking a third predetermined distance as a radius, the seventh arc passes through each of a fifteenth position, a sixteenth position and a seventeenth position, the third predetermined distance is determined according to a visible distance of the cleaning robot and a moveable distance of the charging station, the fifteenth position is at the third predetermined distance from the marked position along a first direction, the sixteenth position is at the third predetermined distance from the marked position along a second direction, the seventeenth position is at the third predetermined distance from the marked position in front of the marked position, and the first direction is opposite to the second direction.

In some embodiments, the controller is further configured to:

acquire the marked position of the charging station in the map when the charging station is displaced with respect to the marked position; or acquire marked positions of a plurality of charging stations in the map when the cleaning robot detects the plurality of charging stations during a cleaning process and when distances among the marked positions of the plurality of charging stations are less than a preset value.

In another aspect, a method for controlling a cleaning robot is provided. The method can include:

acquiring a marked position of a charging station in a map, the map being drawn by the cleaning robot;

controlling the cleaning robot to travel to a front position of the marked position and identifying the charging station;

generating a finding path based on the marked position when the charging station is not identified; and controlling the cleaning robot to travel according to the finding path and identifying the charging station during a traveling process.

In some embodiments, controlling the cleaning robot to travel according to the finding path and identifying the charging station during the traveling process includes:

controlling the cleaning robot to travel a first distance along a first direction and identifying the charging station during the traveling process;

controlling the cleaning robot to return to the front position of the marked position when the charging station is not identified; and controlling the cleaning robot to travel a second distance along a second direction and identifying the charging station during the traveling process;

the first direction being opposite to the second direction.

In some embodiments, controlling the cleaning robot to travel according to the finding path and identifying the charging station during the traveling process includes:

controlling the cleaning robot to travel along a first arc and identifying the charging station during the traveling process, the first arc being defined by taking a first position behind the marked position as a circle center and taking a distance between the first position and a second position as a radius, the first arc passing through both the front position and the second position;

controlling the cleaning robot to return to the front position of the marked position when the charging station is not identified; and controlling the cleaning robot to travel along a second arc and identifying the charging station during the traveling process, the second arc being defined by taking the first position behind the marked position as a circle center and taking a distance between the first position and a third position as a radius, the second arc passing through both the front position and the third position;

in which, the first position and the marked position are separated by a third distance, the second position is at a fourth distance from the marked position along a first direction, the third position is at a fifth distance from the marked position along a second direction, and the first direction is opposite to the second direction.

In some embodiments, controlling the cleaning robot to travel according to the finding path and identifying the charging station during the traveling process includes:

controlling the cleaning robot to travel along a third arc and identifying the charging station during the traveling process, the third arc being defined by taking the marked position as a circle center and taking a first predetermined distance as a radius, the third arc passing through both a fourth position and a fifth position;

controlling the cleaning robot to return to the fifth position when the charging station is not identified; and controlling the cleaning robot to travel along a fourth arc and identifying the charging station during the traveling process, the fourth arc being defined by taking the marked position as a circle center and taking the first predetermined distance as a radius, the fourth arc passing through both the fifth position and a sixth position;

in which the first predetermined distance is determined according to a visible distance of the cleaning robot, the fourth position is at the first predetermined distance from the marked position along the first direction, the fifth position is at the first predetermined distance from the marked position in front of the marked position, the sixth position is at the first predetermined distance from the marked position along the second direction, and the first direction is opposite to the second direction.

In some embodiments, controlling the cleaning robot to travel according to the finding path and identifying controlling the cleaning robot to travel according to the finding path and identifying the charging station during the traveling process includes:

controlling the cleaning robot to travel to an arbitrary position of a fifth arc, the fifth arc being defined by taking a seventh position as a circle center and taking a first predetermined distance as a radius, the fifth arc passing through each of an eighth position, a ninth position and a tenth position;

controlling the cleaning robot to travel along the fifth arc and identifying the charging station during the traveling process;

controlling the cleaning robot to travel to an arbitrary position of a sixth arc when the charging station is not identified, the sixth arc being defined by taking an eleventh position as a circle center and by taking the first predetermined distance as a radius, the sixth arc passing through each of a twelfth position, a thirteenth position and a fourteenth position; and controlling the cleaning robot to travel along the sixth arc and identifying the charging station during the traveling process;

in which the seventh position is at a second predetermined distance from the marked position along a first direction, the eighth position is at the first predetermined distance from the seventh position along the first direction, the ninth position is at the first predetermined distance from the seventh position along a second direction, the tenth position is at the first predetermined distance from the seventh position in front of the seventh position, the eleventh position is at the second predetermined distance from the marked position along the second direction, the twelfth position is at the first predetermined distance from the eleventh position along the first direction, the thirteenth position is at the first predetermined distance from the eleventh position along the second direction, the first predetermined distance is determined according to a visible distance of the cleaning robot, the second predetermined distance is determined according to a moveable distance of the cleaning robot, and the first direction is opposite to the second direction.

In some embodiments, controlling the cleaning robot to travel according to the finding process and identifying the charging station during the traveling process includes:

controlling the cleaning robot to travel along a seventh arc and identifying the charging station during the traveling process;

in which the seventh arc is defined by taking the marked position as a circle center and by taking a third predetermined distance as a radius, the seventh arc passes through each of a fifteenth position, a sixteenth position and a seventeenth position, the third predetermined distance is determined according to a visible distance of the cleaning robot and a moveable distance of the charging station, the fifteenth position is at the third predetermined distance from the marked position along a first direction, the sixteenth position is at the third predetermined distance from the marked position along a second direction, the seventeenth position is at the third predetermined distance from the marked position in front of the marked position, and the first direction is opposite to the second direction.

In some embodiments, acquiring the marked position of the charging station in the map includes:

acquiring the marked position of the charging station in the map when the charging station is displaced with respect to the marked position; or acquiring marked positions of a plurality of charging stations in the map when the cleaning robot detects the plurality of charging stations during a cleaning process and when distances among the marked positions of the plurality of charging stations are less than a preset value.

In another aspect, a non-transitory computer readable storage medium is provided, having instructions stored thereon. The instructions are executable by a controller or processor to realize the controlling of the cleaning robot.

One or more embodiments of the present disclosure can include one or more of the following advantages.

By controlling the cleaning robot to travel to the front position of the marked position of the charging station included in the map, when the charging station is not identified, the finding path is generated based on the marked position. The cleaning robot is controlled to travel according to the finding path and to identify the charging station during the traveling process. A problem that the cleaning robot cannot find the charging station and cannot perform a charging-station-returning operation due to the difference between the actual position and the marked position included in the map may be solved, thereby improving intelligence of the cleaning robot and reducing manual intervention.

BRIEF DESCRIPTION OF THE DRAWINGS

To clearly illustrate the various embodiments provided in the present disclosure, the following are drawings that accompany the description of the embodiments.

It is noted that these drawings should be interpreted to serve illustrating purposes only, and that these drawings may represent just some, but not all, of embodiments of the present disclosure. For those skilled in the art, other embodiments that are based on the structures as described below and illustrated in these drawings may become obvious. As such, these other embodiments should be interpreted to be contained within the scope of the disclosure.

DETAILED DESCRIPTION

Various embodiments of the present disclosure are described below with specific examples, and other advantages and effects of the present disclosure can be easily understood by those skilled in the field of technology from the contents disclosed in this specification.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

In some cases, the cleaning robot is configured to perform a cleaning operation starting from a charging station while drawing a map marked with a position of the charging station. However, when the cleaning robot performs a charging-station-returning task, the position of the charging station may be changed already. For example, the charging station is moved by a user, or the charging station is collided by a pet, or the cleaning robot is wound by wires during the cleaning operation, for example, the wires are dragged while the cleaning robot is traveling, or the cleaning robot pushes the charging station away during the cleaning operation. The above situations may cause the position of the charging station changed. When an actual position of the charging station is different from the marked position in the map, the cleaning robot is unable to return to the charging station.

In other cases, the cleaning robot performs the cleaning operation starting from another position instead of the position of the charging station. No protective region is arranged around the charging station for preventing the charging station from being collided by the cleaning robot. During the cleaning operation, when the cleaning robot meets the charging station firstly, the cleaning robot travels along outer edges of the charging station. As a result, the charging station may be continuously collided by the cleaning robot, causing the charging station to be translated or rotated. A laser distance sensor (LDS) carried by the cleaning robot may detect several retroreflective light patterns of the charging station and having different orientations in a vicinity of a same position. Therefore, the cleaning robot cannot determine an exact position of the charging station such that the cleaning robot cannot return to the charging station.

Various embodiments of the present disclosure can solve a problem that the cleaning robot is unable to return to the charging station discussed above.

Figure 1A:
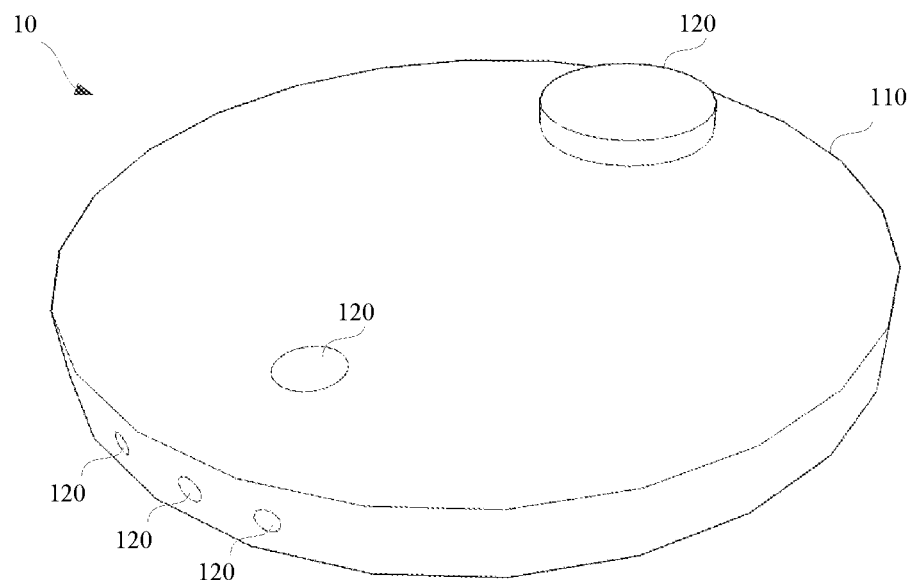
FIG. 1A is a schematic diagram illustrating a cleaning robot according to some embodiments of the present disclosure.
Figure 1B:
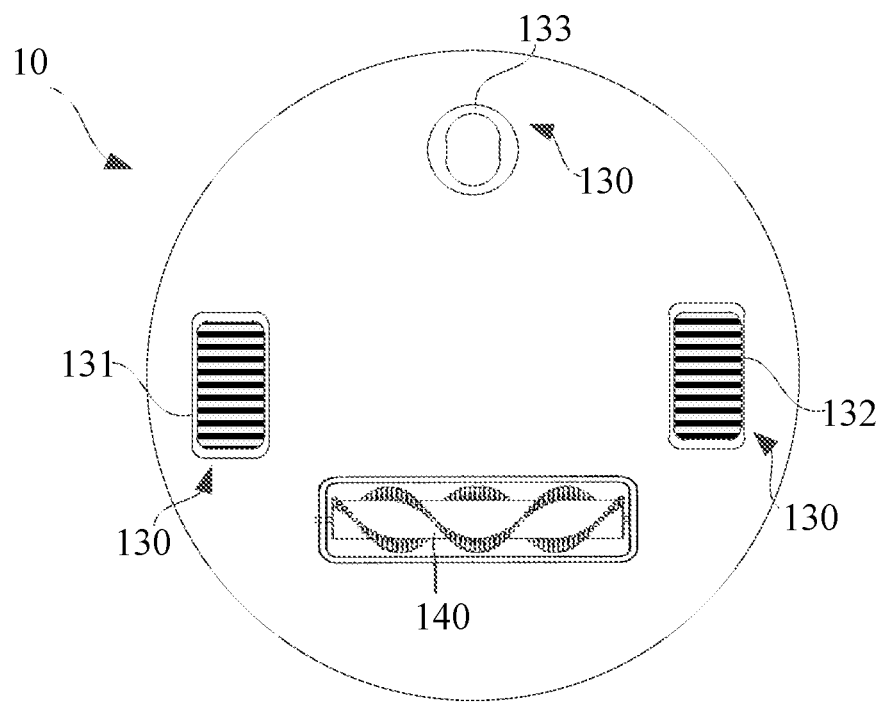
FIG. 1B is a schematic diagram illustrating a cleaning robot according to some embodiments of the present disclosure.
Figure 1C:
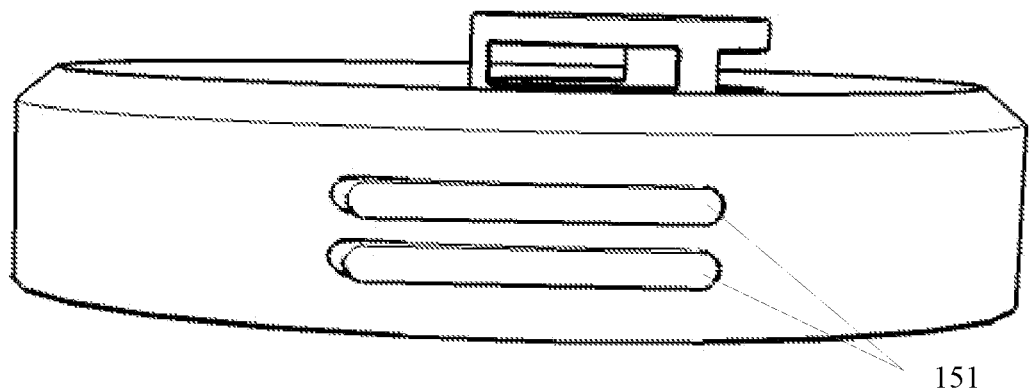
FIG. 1C is a schematic diagram illustrating a cleaning robot according to some embodiments of the present disclosure.

FIGS. 1A, 1B and 1C are schematic diagrams illustrating a cleaning robot according to some embodiments of the present disclosure. FIG. 1A illustrates a top view of the cleaning robot 10, FIG. 1B illustrates a bottom view of the cleaning robot 10, and FIG. 1C illustrates a back view of the cleaning robot 10.

As illustrated in FIGS. 1A, 1B and 1C, the cleaning robot 10 includes a robot body 110, a detection component 120, a driving module 130, a control module (not shown), a storage module (not shown), a main brush 140 and a battery module (not shown).

The various device components, units, blocks, or portions may have modular configurations, or are composed of discrete components, but nonetheless may be referred to as "modules" in general. In other words, the "components," "modules" or "units" referred to herein may or may not be in modular forms.

The robot body 110 forms a housing of the cleaning robot, and is configured to accommodate other components.

In some embodiments, the robot body 110 is flat-cylindrical-shaped.

The detection component 120 is configured to detect circumferential environment of the cleaning robot, so as to find an environmental object, such as an obstacle, a wall, a step, and a charging station for charging the cleaning robot. The detection component 120 is further configured to provide various positional information and movement status information of the cleaning robot to the control module. The detection component 120 may include a cliff sensor, an ultrasonic sensor, an infrared sensor, a magnetometer, a three-axis accelerometer, a gyroscope, an odometer, a LDS, an ultrasonic wave sensor, a camera, a Hall sensor, and the like. The number and the position of the detection component 120 are not limited in embodiments.

The LDS is located at the upper of the robot body 110. The LDS includes a light-emitting unit and a light-receiving unit. The light-emitting unit includes a light-emitting element for emitting lights. For example, the light-emitting element is an infrared light emitting diode (LED) for emitting infrared lights, or a visible LED for emitting visible lights, or a laser diode for emitting lasers. The light-receiving unit includes an image sensor. Lights reflected off ambient objects may form light points with different brightness values on the image sensor. The light point with a higher brightness value than a predetermined brightness value is called as a bright point, while the light point with a lower brightness value than the predetermined brightness value is called as a dark point. In some embodiments, the image sensor is a complementary metal oxide semiconductor (CMOS) sensor or a charge-coupled device (CCD) sensor.

Figure 1D:
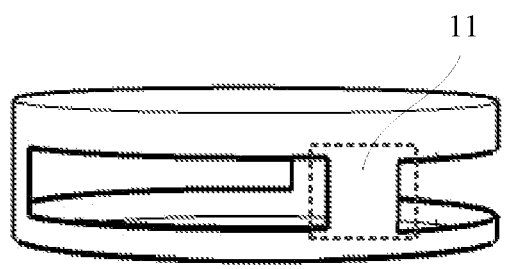
FIG. 1D is a schematic diagram illustrating a protective cover of a laser distance sensor (LDS) according to some embodiments of the present disclosure.

Due to a protective cover arranged outside the LDS, a position of a support pillar of the protective cover not only blocks lights emitted by the light-emitting unit of the LDS, but also blocks reflected lights to be received by the light-receiving unit of the LDS. Therefore, the position of the support pillar of the protective cover is a detection dead zone of the LDS. FIG. 1D illustrates a schematic diagram of a protective cover of the LDS. The position of the support pillar of the protective cover is within a region 11, i.e., the detection dead zone of the LDS.

The driving module 130 is configured to drive the cleaning robot to travel forwards or backwards.

In some embodiments, the driving module 130 includes a pair of driving wheels 131 and 132 arranged on the bottom of the robot body 110, at two sides of the middle. The driving wheels 131 and 132 are configured to drive the cleaning robot to travel forwards or backwards.

In some embodiments, the driving module 130 further includes a guide wheel 133 arranged in the front of the robot body 110. The guide wheel 133 is configured to change a traveling direction of the cleaning robot while the cleaning robot is travelling.

The control module is arranged on a circuit board inside the robot body 110, including a processor. The processor may be configured to draw a real-time map where the cleaning robot is located according to information on environmental objects fed back from the LDS and a preset positioning algorithm. The processor may be further configured to determine a current working status of the cleaning robot by taking both distance information and velocity information fed back from the cliff sensor, the ultrasonic sensor, the infrared sensor, the magnetometer, the accelerometer, the gyroscope, the odometer and the like into consideration.

The storage component is arranged on the circuit board included in the robot body 110. The storage component includes a memory. The memory may store the positional information and the velocity information of the cleaning robot, and the real-time map drawn by the processor.

The main brush 140 is arranged at the bottom of the robot body 110. In some embodiments, the main brush 140 may be a drum-shaped rotating brush rotating by a roller type with respect to a contact surface.

The battery component includes a chargeable battery, a charging circuit connected to the chargeable battery, and a charging electrode 151 arranged on sides of the robot body of the cleaning robot. In some embodiments, the charging circuit includes a charging control circuit, a charging temperature detection circuit, and a charging voltage detection circuit. In some embodiments, the charging electrode 151 is strip-shaped and two charging electrodes are included.

It is noted that, the cleaning robot may further include other modules or components, or may only include the above-mentioned module or component, which is not limited in embodiments. The above cleaning robot with specific configurations is only used as an example for illustration.

Figure 2A:
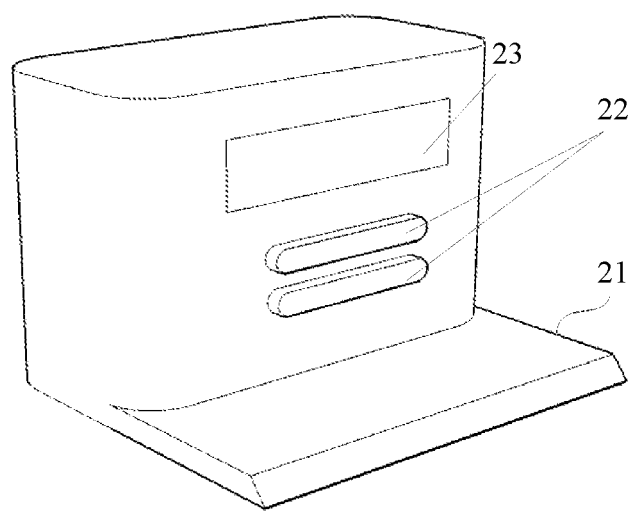
FIG. 2A is a schematic diagram illustrating a charging station according to some embodiments of the present disclosure.

FIG. 2A is a schematic diagram illustrating a charging station for charging a cleaning robot involved in exemplary embodiments of the present disclosure.

As illustrated in FIG. 2A, the charging station includes a station body 21, a charging electrode 22 arranged at the front of the station body 21, and a retroreflective light pattern region 23.

A base of the station body 21 has a certain slope to facilitate climbing the charging station by the cleaning robot.

The charging electrode 22 is arranged at a front face of the charging station. The charging electrode 22 is configured to provide a charging interface for the cleaning robot. When the charging electrode 151 at a side face of the cleaning robot is attached to the charging electrode 22 of the charging station, the charging station charges the cleaning robot.

In some embodiments, the charging electrode is strip-shaped. The charging station includes two charging electrodes 22.

Figure 2B:
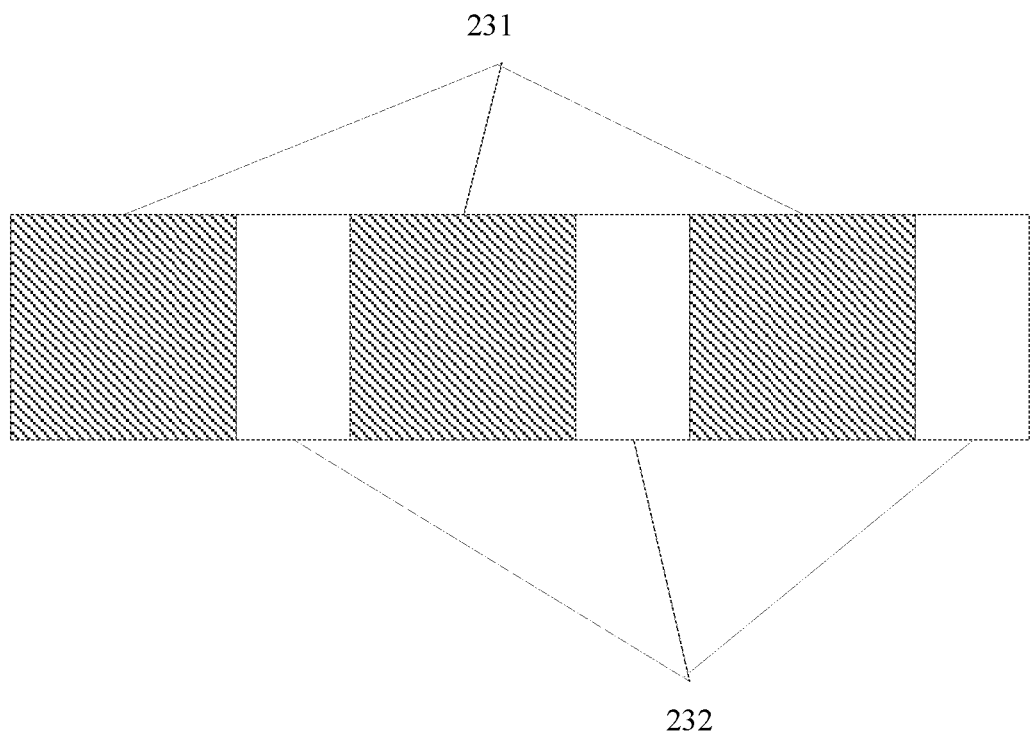
FIG. 2B is a schematic diagram illustrating a charging station according to some embodiments of the present disclosure.

The retroreflective light pattern region 23 is arranged at a same face with an electronic dome 22. Different parts of the retroreflective light pattern region have different reflective coefficients. When the lights emitted from the LDS of the cleaning robot impinges the retroreflective light pattern region, intensities of lights reflected off the retroreflective light pattern region received by the LDS are different in different parts, such that the image sensor of the LDS may generate a predetermined reflective light pattern. For example, lights reflected off a region having a high retroreflective coefficient form bright points on the image sensor, while lights reflected off a region having a low retroreflective coefficient form dark points on the image sensor. FIG. 2B illustrates a retroreflective light pattern region where the retroreflective coefficient of the region 231 is less than the retroreflective coefficient of the region 232.

Figure 2C:
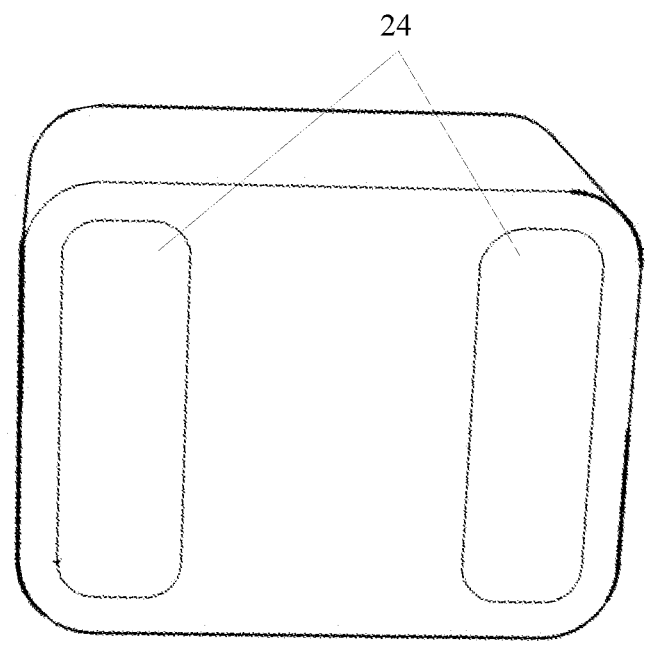
FIG. 2C is a schematic diagram illustrating a charging station according to some embodiments of the present disclosure.

In order to avoid that the charging station is displaced due to extrusion of the cleaning robot when the cleaning robot climbing the charging station, an anti-slip mat is arranged at the bottom of the charging station. Friction between the anti-slip mat and the ground may interact with the force generated due to the extrusion subjected by the charging station. In some embodiments, two anti-slip mats are arranged at the bottom of the charging station. Frictional coefficient of the anti-slip mat may be determined according to actual requirements. FIG. 2C illustrates a bottom structure of the charging station. Totally two anti-slip mats 24 are arranged at the bottom of the charging station.

It is noted that, the charging station may include other components, or only include the above-mentioned components, which is not limited in embodiments, and the above charging station is only used as an example for illustration.

Figure 3:
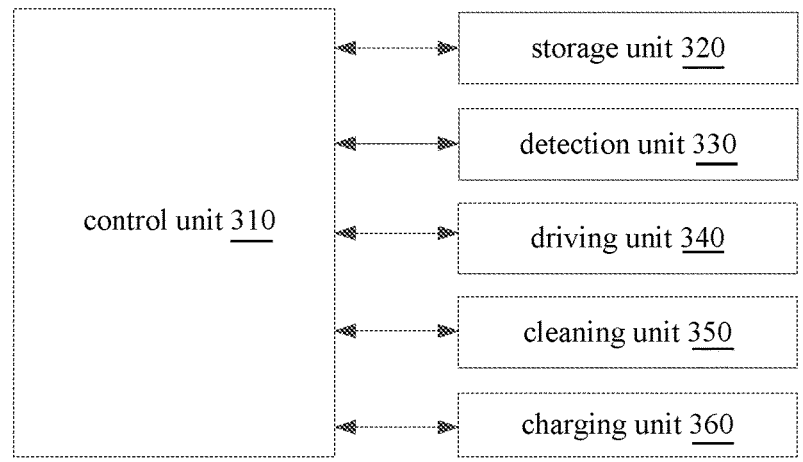
FIG. 3 is a block diagram illustrating a cleaning robot according to some embodiments of the present disclosure.

FIG. 3 is a block diagram illustrating a cleaning robot according to some embodiments. The cleaning robot includes a control unit 310, also referred to as a controller; a storage unit 320, also referred to as a storage device; a detection unit 330, also referred to as a detector; a driving unit 340, also referred to a driver; a cleaning unit or portion 350 and a charging unit or portion 360.

The control unit 310 is configured to control an overall operation of the cleaning robot. When receiving an instruction of cleaning, the control unit 310 may be configured to control the cleaning robot to travel according to a predetermined logic and to perform the cleaning operation while traveling. When receiving an instruction of traveling, the control unit 310 is configured to control the cleaning robot to travel along a traveling path in a predetermined travelling mode. Other instructions of the user received by the control unit 310 are not elaborated in embodiments.

The storage unit 320 is configured to store at least one instruction. The at least one instruction includes an instruction of traveling in the predetermined travelling mode and along the travelling path, the instruction of cleaning, an instruction of drawing a real-time map, an instruction for finding the charging station, and the like. The storage unit 320 is further configured to store self-location data, obstacle data and wall data sensed during the travelling process of the cleaning robot.

The detection unit 330 is configured to detect the obstacle and the charging station during the traveling process of the cleaning robot, traveling status of the cleaning robot, and the like.

The driving unit 340 is configured to control a driving direction and rotation speed of the driving wheel according to a control signal of the control unit 310.

The cleaning unit 350 is configured to control the cleaning robot to travel according to the predetermined logic after receiving the instruction of cleaning, and control the main brush at the bottom of the cleaning robot to clean a contact surface with the main brush in a rotation manner during the traveling process.

The charging unit 360 is configured to charge the cleaning robot after the cleaning robot climbs the charging station.

In some embodiments, the control unit 310 may be realized by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, for executing the method for charging the cleaning robot provided in embodiments.

In some embodiments, the control unit 310 is configured to acquire a marked position of the charging station on the map. The map is drawn by the cleaning robot.

In some embodiments, the control unit 310 is configured to control the cleaning robot to travel to a front position of the marked position and to identify the charging station.

In some embodiments, the control unit 310 is configured to generate a finding path based on the marked position when the charging station is not identified.

In some embodiments, the control unit 310 is configured to control the cleaning robot to travel according to the finding path, and to identify the charging station during the traveling process.

In some embodiments, the control unit 310 is further configured to control the cleaning robot to travel a first distance along a first direction and to identify the charging station during the traveling process.

In some embodiments, the control unit 310 is further configured to control the cleaning robot to return to the front position of the marked position when the charging station is not identified.

In some embodiments, the control unit 310 is further configured to control the cleaning robot to travel a second distance along a second direction and to identify the charging station during the traveling process.

In some embodiments, the first direction is opposite to the second direction.

In some embodiments, the control unit 310 is further configured to control the cleaning robot to travel along a first arc and to identify the charging station during the traveling process. The first circle is defined by taking a first position behind the marked position as a circle center and taking a distance between the first position and a second position as a radius. The first arc passes through both the front position and the second position.

In addition, the control unit 310 is further configured to control the cleaning robot to return to the front position of the marked position when the charging station is not identified.

Furthermore, the control unit 310 can be further configured to control the cleaning robot to travel along a second arc, and to identify the charging station during the traveling process. The second arc is defined by taking the first position behind the marked position as a circle center and taking a distance between the first position and a third position as a radius. The second arc passes through both the front position and the third position.

The first position and the marked position are separated by a third distance. The second position is at a fourth distance from the marked position along a first direction. The third position is at a fifth distance from the marked position along a second direction. The first direction is opposite to the second direction.

In some embodiments, the control unit 310 is further configured to control the cleaning robot to travel along a third arc and to identify the charging station during the travelling process. The third arc is defined by taking the marked position as a circle center and taking a first predetermined distance as a radius. The third arc passes through both a fourth position and a fifth position.

In some embodiments, the control unit 310 is further configured to control the cleaning robot to return to the fifth position when the charging station is not identified.

In some embodiments, the control unit 310 is further configured to control the cleaning robot to travel along a fourth arc and to identify the charging station during a travelling process. The fourth arc is defined by taking the marked position as a circle center and taking the first predetermined distance as a radius. The fourth arc passes through both the fifth position and a sixth position.

In some embodiments, the first predetermined distance is determined according to a visible distance of the cleaning robot. The fourth position is at the first predetermined distance from the marked position along the first direction. The fifth position is at the first predetermined distance from the marked position in front of the marked position. The sixth position is at the first predetermined distance from the marked position along a second direction. The first direction is opposite the second direction. The first arc is defined by determining the first position behind the marked position as the circle center and taking the distance between the first position and the second position as the radius. The first arc passes through both the front position and the second position. The first arc is determined as a first arc-shaped trace.

Additionally, or alternatively, the second arc is defined by taking the first position behind the marked position as the circle center and taking the distance between the first position and the third position as the radius. The second arc passes through both the front position and the third position. The second arc is determined as a second arc-shaped trace.

The first position and the marked position are separated by the third distance. The second position is at the fourth distance from the marked position along the first direction. The third position is at the fifth distance from the marked position along the second direction.

In some embodiments, the control unit 310 is further configured to control the cleaning robot to travel to an arbitrary position on a fifth arc. The fifth arc is defined by taking a seventh position as a circle center and taking the first predetermined distance as a radius. The fifth arc passes through each of an eighth position, a ninth position and a tenth position.

In some embodiments, the control unit 310 is further configured to control the cleaning robot to travel along the fifth arc and to identify the charging station during the traveling process.

In some embodiments, the control unit 310 is further configured to control the cleaning robot to travel to an arbitrary position on a sixth arc when the charging station is not identified. The sixth arc is defined by taking an eleventh position as a circle center and taking the first predetermined distance as a radius. The sixth arc passes through each of a twelfth position, a thirteenth position and a fourteenth position.

In some embodiments, the control unit 310 is further configured to control the cleaning robot to travel along the sixth arc and to identify the charging station during the traveling process.

In some embodiments, the seventh position is at a second predetermined distance from the marked position along the first direction. The eighth position and the seventh position are separated by the first predetermined distance along the first direction. The ninth position and the seventh position are separated by the first predetermined distance along the second direction. The tenth position is at the first predetermined distance from the seventh position in front of the seventh position. The eleventh position is at the second predetermined distance from the marked position along the second direction. The twelfth position is at the first predetermined distance from the eleventh position along the first direction. The thirteenth position is at the first predetermined distance from the eleventh position along the second direction. The first predetermined distance is determined according to a visible distance of the cleaning robot. The second predetermined distance is determined according to a moveable distance of the charging station. The first direction is opposite to the second direction.

In some embodiments, the control unit 310 is further configured to control the cleaning robot to travel along a seventh arc and to identify the charging station during the traveling process.

The seventh arc is defined by taking the marked position as a circle center and taking a third predetermined distance as a radius. The seventh arc passes through each of a fifteenth position, a sixteenth position and a seventeenth position. The third predetermined distance is determined according to a visible distance of the cleaning robot and a moveable distance of the charging station. The fifteenth position is at a third predetermined distance from the marked position along the first direction. The sixteenth position is at the third predetermined distance from the marked position along the second direction. The seventeenth position is at the third predetermined distance from the marked position in front of the marked position. The first direction is opposite to the second direction.

In some embodiments, the control unit 310 is further configured to acquire the marked position of the charging station on the map when the charging station is displaced with respect to the marked position.

In some embodiments, the control unit 310 is configured to acquire the marked position of the charging station on the map when several charging stations are detected during the cleaning operation of the cleaning robot and distances among marked positions of the several charging stations are less than a preset value.

In some embodiments, there is further provided a non-transitory computer readable storage medium having instructions, for example a storage device 320 including instructions. The above instructions may be executed by the control unit 310 to perform the method for controlling the cleaning robot according to above embodiments. For example, the non-transitory computer readable storage medium may be a read only memory (ROM), a random-access memory (RAM), a compact disc read only memory (CD-ROM), a tape, a floppy disk and optical data storage devices, etc.

When the cleaning robot is working, the position of the charging station is included in the map drawn by the cleaning robot. When electric quantity of the cleaning robot is less than a predetermined electric quantity or the cleaning operation is completely done, the cleaning robot acquires the marked position of the charging station on the map, and travels to the marked position of the charging station to perform the charging-station-returning task.

However, in practical situations, the position of the charging station may be changed, that is a difference exits between an actual position of the charging station and the marked position in the map drawn by the cleaning robot. The cleaning robot is unable to perform the charging-station-returning task according to the marked position.

For example, during a process that the cleaning robot performs the cleaning operation, the cleaning robot pushes the charging station away such that the charging station is displaced, or the cleaning robot is wound by wires during the cleaning operation such as the wires are dragged while the cleaning robot is traveling, or the charging station is moved by the user or the pet such that the charging station is displaced. As a result, there is a difference between the actual position of the charging station and the marked position in the map. The cleaning robot is unable to perform the charging-station-returning task according to the marked position.

Because the charging station connects to a power socket via a wire in some embodiments, a displacement distance of the charging station may be limited to the length of the wire. During the displacement, the charging station may be translated or may be rotated.

Figure 4A:
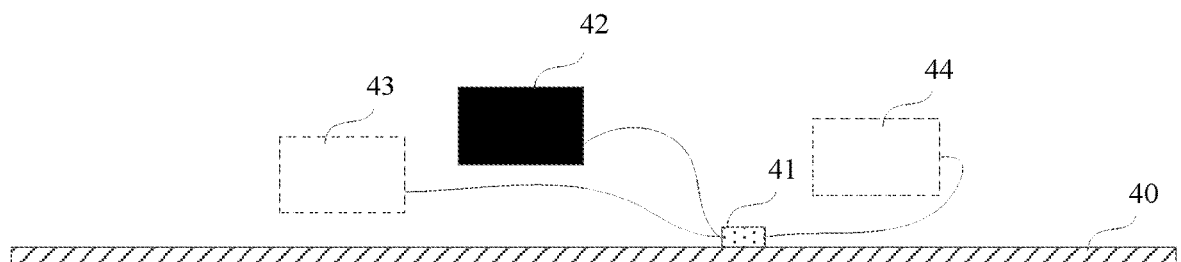
FIG. 4A is a schematic diagram illustrating a position where a charging station is located according to some embodiments of the present disclosure.

For example, when the charging station is translated, as illustrated in FIG. 4A, the charging station is connected to the power socket 41 arranged on a wall 40. The cleaning robot starts from the charging station. The marked position of the charging station recorded on the map is illustrated as the position 42. When the cleaning robot performs the cleaning operation, the cleaning robot is moved in translation by the user. After moving, the position of the charging station may be the position 43, the position 44, or other reachable positions by the charging station due to the wire.

Figure 4B:
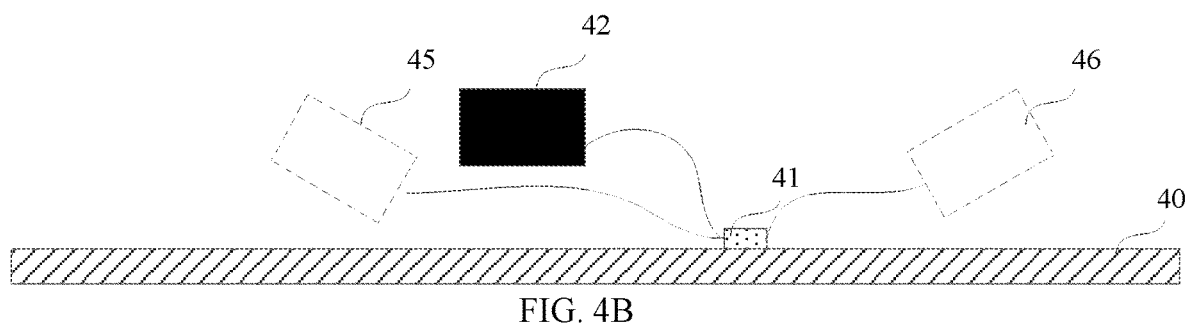
FIG. 4B is a schematic diagram illustrating another position where a charging station is located according to some embodiments of the present disclosure.

For example, when the charging station is moved in rotation, as illustrated in FIG. 4B, the charging station is connected to the power socket 41 arranged on the wall 40. The cleaning robot starts from the charging station. The marked position of the charging station included in the map is illustrated as 42. When the cleaning robot performs the cleaning operation, the user moves the charging station and rotates the charging station. The position of the charging station after the moving may be the position 45, the position 46, or other reachable positions by the charging station due to the wire.

The above cleaning robot is used only as an example to illustrate the related control method in embodiments of the present disclosure. The type of the cleaning robot is not limited in embodiments of the present disclosure.

In some embodiments, non-contact charging or wireless charging can be employed instead of the charging by contacting the electrodes.

Figure 5:
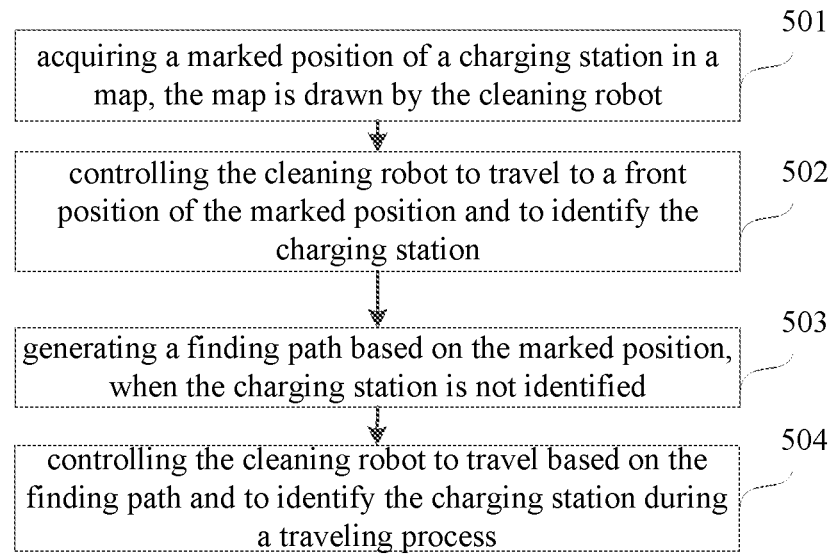
FIG. 5 is a flowchart illustrating a method for controlling a cleaning robot according to some embodiments of the present disclosure.

FIG. 5 is a flowchart illustrating a method for controlling a cleaning robot according to some embodiments. The method for controlling a cleaning robot includes the following.

In block 501, a marked position of a charging station is acquired from a map. The map is drawn by the cleaning robot.

In block 502, the cleaning robot is controlled to travel to a front position of the marked position and to identify a charging station.

In some embodiments, a retroreflective light pattern is acquired by the cleaning robot when the cleaning robot is traveling. When the retroreflective light pattern acquired conforms to a retroreflective light pattern of the charging station, it is determined that the charging station is identified.

In block 503, when the charging station is not identified, a finding path is generated based on the marked position.

In block 504, the cleaning robot is controlled to travel according to the finding path, and to identify the charging station during the traveling process.

As such, with the method for controlling a cleaning robot provided in embodiments of the present disclosure, by controlling the cleaning robot to travel to the front position of the marked position of the charging station included in the map, when the charging station is not identified, the finding path is generated based on the marked position. The cleaning robot is controlled to travel according to the finding path and to identify the charging station during the traveling process. A problem that the cleaning robot cannot find the charging station and cannot perform a charging-station-returning operation due to the difference between the actual position and the marked position included in the map may be solved, thereby improving intelligence of the cleaning robot and reducing manual intervention.

Figure 6A:
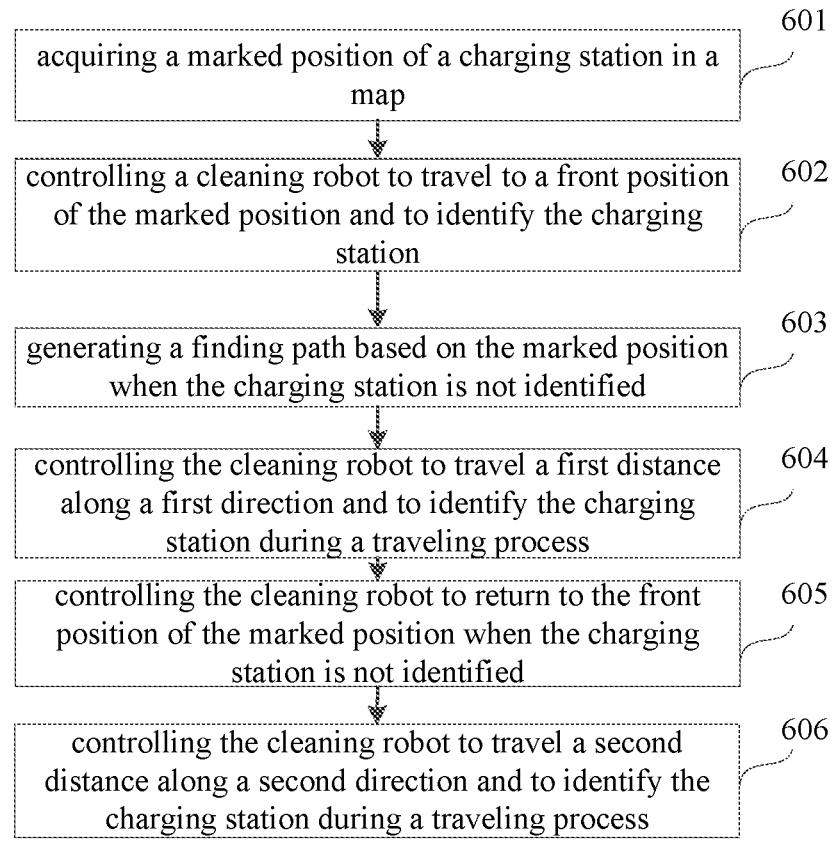
FIG. 6A is a flowchart illustrating another method for controlling a cleaning robot according to some embodiments of the present disclosure.

FIG. 6A is a flowchart illustrating a method for controlling a cleaning robot according to some other embodiments. The method for controlling a cleaning robot includes the followings.

In block 601, the marked position of the charging station included in the map is acquired.

In some embodiments, the map can be drawn by the cleaning robot.

In some embodiments, when the charging station is displaced with respect to the marked position, the marked position of the charging station included in the map is acquired.

When the cleaning robot starts from the charging station to perform the cleaning operation, the marked position of the charging station is included in the map drawn by the cleaning robot. When the charging station is moved with respect to the marked position, the actual position of the charging station is different from the marked position on the map. For example, the charging station is moved by a user, or the charging station is collided by a pet, or the cleaning robot is wound by wires during the cleaning operation such as the wires are dragged while the cleaning robot is traveling, or the cleaning robot pushes the charging station during the cleaning operation. The above situations may cause the position of the charging station to be changed. That is, the position of the charging station is changed against the marked position.

In some embodiments, when several charging stations are detected by the cleaning robot during the cleaning process and the distances among the marked positions of the several charging stations are less than a preset value, the marked positions of the several charging stations are acquired form the map.

In some embodiments, the number of the charging stations detected by the cleaning robot during the cleaning process may be at least two.

In some embodiments, the preset value is set in advance. The preset value is for example 5 centimeters. When the distances among the marked positions of the several charging stations are less than the preset value, it is illustrated that the position of the charging station is constantly changed in a victory of an initial position under influenced of external factors. A moveable range of the charging station is limited to a length of a power wire of the charging station.

In some embodiments, the cleaning robot detects that at least two charging stations are orientated differently. When the cleaning robot is collided with the charging station, the charging station is displaced, and further the charging station may be rotated.

When the cleaning robot performs the cleaning operation from other positions instead of the charging station, the cleaning robot may detect the charging station during the cleaning process and draw the position of the charging station detected into the map. When the cleaning robot meets the charging station at the first time, the cleaning robot may travel along outer edges of the charging station. As a result, the charging station may be continuously collided by the cleaning robot, causing the charging station to translate or rotate. The LDS of the cleaning robot may detect several retroreflective light patterns in vicinity of a same position. That is, the cleaning robot may mark several charging stations on the map.

In block 602, the cleaning robot is controlled to travel to the front position of the marked position, and to identify the charging station.

In some embodiments, the front position of the marked position is determined according to ordinates of the marked position included in the map. A position having a horizontal coordinate with an absolute value of a difference from a horizontal coordinate of the marked position is less than a predetermined value and having a longitudinal coordinate greater than the longitudinal coordinate of the marked position is determined as the front position of the marked position. For example, the coordinates of the marked position are (5, 3), the predetermined value is 3. A position having the horizontal coordinate greater than 2 and less than 8 and having the longitudinal coordinate greater than 3 is determined as the front position of the marked position.

In some embodiments, the cleaning robot is controlled to travel to a right front position of the marked position. In some embodiments, the right front position of the marked position has the same horizontal coordinate with the marked position.

Figure 6B:
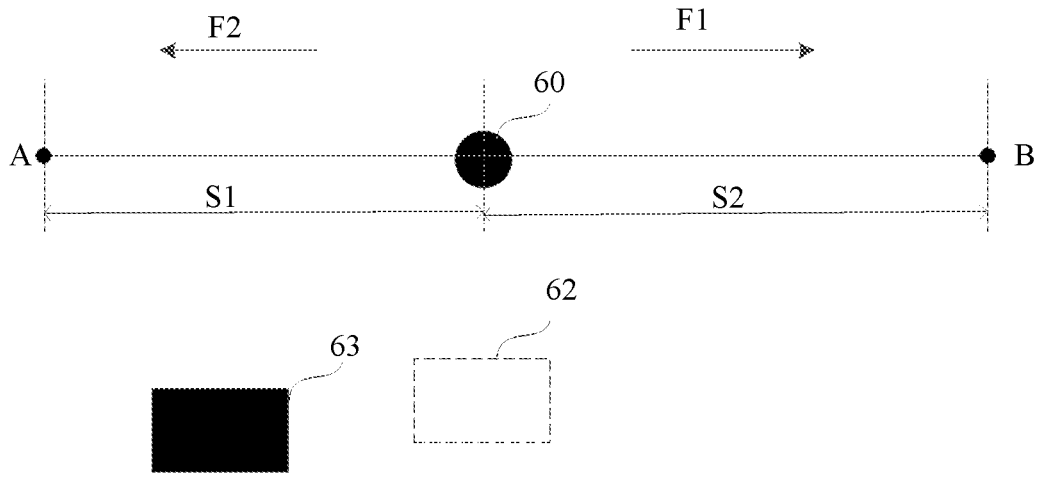
FIG. 6B is a schematic diagram illustrating an implementation of a method for controlling a cleaning robot according to some embodiments of the present disclosure.

For example, as illustrated in FIG. 6B, the marked position of the charging station in the map is illustrated as the position 62. The cleaning robot is controlled to travel to the front position 60 of the marked position.

In some embodiments, the retroreflective light pattern is acquired by the cleaning robot during the traveling travel. When the retroreflective light pattern acquired conforms to the retroreflective light pattern of the charging station, it is determined that the charging station is identified.

When the charging station is identified at the front position in front of the marked position, the cleaning robot is controlled to travel to the charging station for charging. When the charging station is not identified at the front position of the marked position, a block 603 is executed.

In block 603, when the charging station is not identified, the finding path is generated according to the marked position.

In block 604, the cleaning robot is controlled to travel the first distance along the first direction and to identify the charging station during the traveling process.

In some embodiments, the first direction is the left of the marked position. In some embodiments, the first direction is the right of the marked position.

In some embodiments, when the cleaning robot is controlled to travel, longitudinal coordinates of positions traveled by the cleaning robot are same with a longitudinal coordinate of the front position.

In some embodiments, the first distance is less than or equal to a maximum distance that the charging station is able to move. For example, the maximum distance that the charging station is able to move is 0.5 meter, and the first distance is less than or equal to 0.5 meter.

When the charging station is identified during the traveling process along the first direction, the cleaning robot is controlled to travel to the charging station for charging. When the charging station is not identified during the traveling process along the first direction, a block 605 is executed.

In block 605, when the charging station is not identified, the cleaning robot is controlled to return to the front position of the marked position.

In some embodiments, the cleaning robot is controlled to return to the front position of the marked position along a direction opposite to the first direction, or return to the front position of the marked position along other traveling paths.

In block 606, the cleaning robot is controlled to travel a second distance along the second direction and to identify the charging station during the traveling process.

The second direction is opposite to the first direction. When the first direction is the left of the marked position, the second direction is the right of the marked position. When the first direction is the right of the marked position, the second is the left of the marked position.

In some embodiments, the second distance is less than or equal to the maximum distance that the charging station is able to move.

In some embodiments, the second distance is equal to the first distance.

When the charging station is identified during the traveling process along the second direction, the cleaning robot is controlled to travel to the charging station for charging. When the charging station is not identified during the traveling process along the second direction, other strategies are executed, for example, activating an alarm mechanism, or finding the charging station along other traveling paths.

As such, with the method for controlling a cleaning robot provided in embodiments of the present disclosure, the cleaning robot is controlled to travel to the front position of the marked position of the charging station in the map. When the charging station is not identified, the finding path is generated based on the marked position. The cleaning robot is controlled to travel according to the finding path and to identify the charging station during the traveling process. A problem that the cleaning robot cannot find the charging station and cannot perform the charging-station-returning operation due to the difference between the actual position and the marked position included in the map may be solved, thereby improving intelligence of the cleaning robot and reducing manual intervention.

In addition, by controlling the cleaning robot to travel along the first direction and/or along the second direction, when the charging station is displaced in translation, a possibility that the charging station is found automatically by the cleaning robot may be improved.

In an example, the marked position of the charging station in the map is indicated as the position 62, and the actual position of the charging station is indicated as the position 63. The cleaning robot is controlled to travel to the front position 60 of the marked position, as illustrated in FIG. 6B. The charging station is not identified by the cleaning robot at the front position 60. As a result, the finding path is generated based on the marked position.

Because there may be two traveling directions F1 and F2, and assuming F1 is the first direction and F2 is the second direction, the cleaning robot is controlled to travel from the front position 60 along the direction F1 to the point B. The front position 60 and the position B are separated by 1 meter. During the traveling process along the direction F1, when the charging station is not identified, the cleaning robot is controlled to return to the front position 60. The cleaning robot is controlled to travel to the position A along the direction F2. The front position 60 and the position A are separated by 1 meter. During the traveling process along the direction F2, when the charging station is identified and when it is determined that the charging station is located at the position 63, the cleaning robot is controlled to travel to the charging station for charging.

Assuming that the cleaning robot is controlled to travel to the position A along the direction F2, during the traveling process along the direction F2, it is identified that the charging station is located at the position 63. The cleaning robot is controlled to travel to the charging station for charging, without returning to the front position 60.

In some cases, the charging station can be rotated. As such, the charging station may be not identified during the traveling process along a straight line since the LDS of the cleaning robot has the detection dead zone. Therefore, the cleaning robot may be controlled to travel along an arc-shaped trace.

Figure 7A:
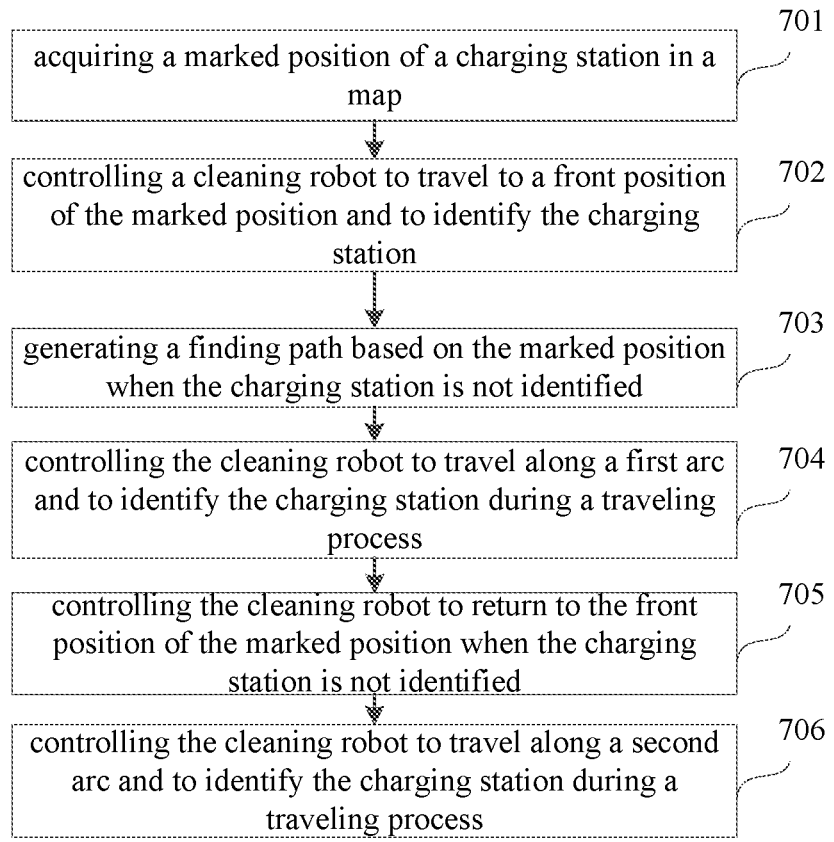
FIG. 7A is a flowchart illustrating another method for controlling a cleaning robot according to some embodiments of the present disclosure.

FIG. 7A is a flowchart illustrating a method for controlling a cleaning robot provided in some other embodiments. The method for controlling a cleaning robot includes the followings.

In block 701, the marked position of the charging station in the map is acquired.

In some embodiments, the map can be drawn by the cleaning robot.

Details of this block are described in detail in descriptions of block 601, which are not elaborated herein.

In block 702, the cleaning robot is controlled to travel to the front position of the marked position and to identify the charging station.

Details of this block are described in detail in descriptions of block 601, which are not elaborated herein.

In block 703, when the charging station is not identified, the finding path is generated based on the marked position.

In block 704, the cleaning robot is controlled to travel along a first arc and to identify the charging station during the traveling process.

The first arc is defined by taking the first position behind the marked position as a circle center and taking a distance between the first position and a second position as a radius. The first arc passes through both the front position and the second position. The first position and the marked position are separated by a third distance. The second position is at a fourth distance from the marked position along the first direction.

In some embodiments, the distance between the front position and the marked position is an optimum visible distance of the cleaning robot. For example, when the optimum visible distance of the cleaning robot is 0.5 meter, the distance between the front position and the marked position is 0.5 meter.

In some embodiments, the fourth distance between the second position and the marked position is a sum of the optimum visible distance of the cleaning robot and a moveable distance of the charging station. For example, when the optimum visible distance of the cleaning robot is 0.5 meter and the moveable distance of the charging station is 0.5 meter, the fourth distance between the second position and the marked position is 1 meter.

Figure 7B:
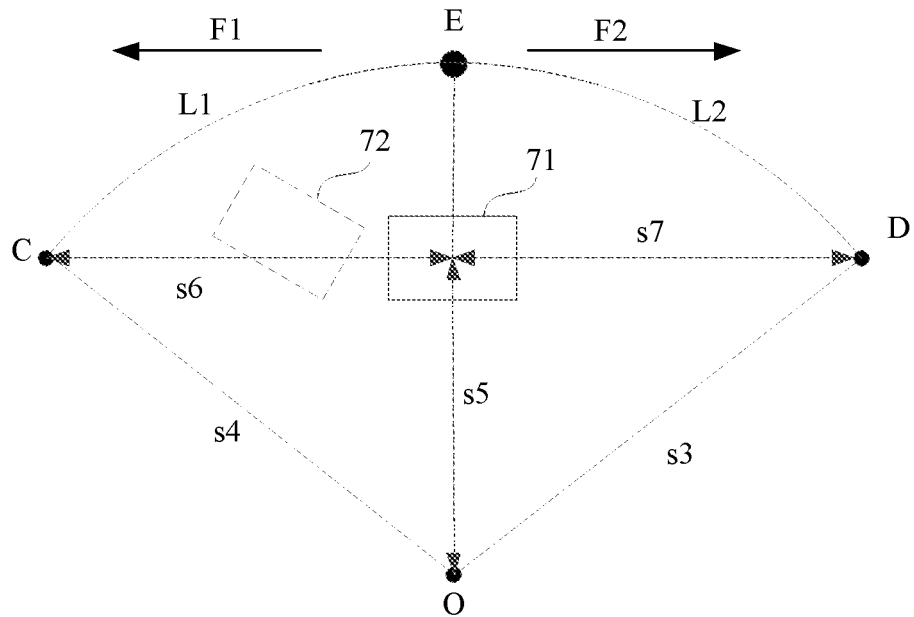
FIG. 7B is a schematic diagram illustrating an implementation of a method for controlling a cleaning robot according to some embodiments of the present disclosure.

For example, as illustrated in FIG. 7B, the first direction is direction F1, the marked position of the charging station is position 71, the first position is point O, the second position is point C, the front position of the marked position is point E, the distance between the first position (point O) and the marked position 71 is third distance s5, the distance between the second position and the marked position 71 along the direction F1 is fourth distance s6, and the distance between the first position (point O) and the second position (point C) is s4. An arc L1 is defined by determining the first position (point O) as the circle center and determining s4 as the radius. L1 is determined as the first arc. The cleaning robot travels along the first arc L1, and identifies the charging station during the traveling process.

When the charging station is identified, the cleaning robot is controlled to travel to the charging station for charging. When the charging station is not identified during the traveling process along the first direction, a block 705 is executed.

In block 705, when the charging station is not identified, the cleaning robot is controlled to return to the front position of the marked position.

In some embodiments, the cleaning robot is controlled to return to the front position of the marked position along the first arc, or the cleaning robot is controlled to return to the front position of the marked position along other traveling paths, for example, returning to the front position of the marked position along a connection line between a position where the cleaning robot is currently located and the front position.

In block 706, the cleaning robot is controlled to travel along the second arc and to identify the charging station during the traveling process.

The second arc is defined by taking a first position behind the marked position as a circle center and taking a distance between the first position and a third position as a radius. The second arc passes through both the front position and the third position. The third position is at a fifth distance from the marked position along the second direction.

The first direction is opposite to the second direction.

In some embodiments, the fifth distance is equal to the fourth distance.

For example, as illustrated in FIG. 7B, the first direction is direction F1, and the second direction is direction F2, the marked position of the charging station is position 71, the first position is point O, the front position in front of the marked position is point E, the third position is point D, the distance between the first position (the point O) and the marked position 71 is third distance s5, the distance between the third position and the marked position 71 along the direction F2 is fifth distance s7, and the distance between the first position (point O) and the third position (point D) is s3. An arc L2 is defined by taking the first position (point O) as the circle center and by taking the s3 as the radius. The L2 is determined as the first arc. The cleaning robot travels along the second arc L2 and identifies the charging station during the traveling process.

When the charging station is identified, the cleaning robot is controlled to travel to the charging station for charging. When the charging station is not identified, other strategies are executed, for example activating an alarm mechanism or finding the charging station along other traveling paths.

For example, when the charging station is placed against the wall and the charging station is rotated by a degree greater than 90° (i.e., the retroreflective light pattern region of the charging station is faced to the wall), the cleaning robot is unable to acquire the retroreflective light pattern of the charging station during the traveling process along the finding path. Therefore, the cleaning robot cannot identify the charging station. The cleaning robot makes a beep for prompting the user for manual intervention.

As such, with the method for controlling a cleaning robot provided in embodiments of the present disclosure, by controlling the cleaning robot to travel to the front position of the marked position of the charging station in the map, when the charging station is not identified, the finding path is generated based on the marked position. The cleaning robot is controlled to travel according to the finding path and to identify the charging station during the traveling process. The problem that the cleaning robot cannot find the charging station and cannot perform the charging-station-returning operation due to a difference between an actual position and the marked position included in the map may be solved, thereby improving intelligence of the cleaning robot and reducing manual intervention.

In addition, by controlling the cleaning robot to travel along the first arc and/or along the second arc, when the charging station is moved in rotation, a possibility that the cleaning robot automatically finds the charging station may be improved.

In another example, as illustrated in FIG. 7B, the charging station is actually located at the position 72, and the marked position is the position 71. The charging station is not identified by the cleaning robot at the front position E of the marked position 71. The arc L1 and the arc L2 are generated based on the marked position 71. When the cleaning robot is controlled to travel along the arc L1, and when the charging station is identified at the position 72 during the traveling process, the cleaning robot is controlled to travel to the position 72 for charging.

When the cleaning robot is controlled to travel along the arc L2, and the charging station is not identified during the traveling process, the cleaning robot is controlled to return to the front position E. The cleaning robot is controlled to travel along the arc L1. When the charging station is identified at the position 72 during the traveling process, the cleaning robot is controlled to travel to the position 72 for charging.

Figure 8A:
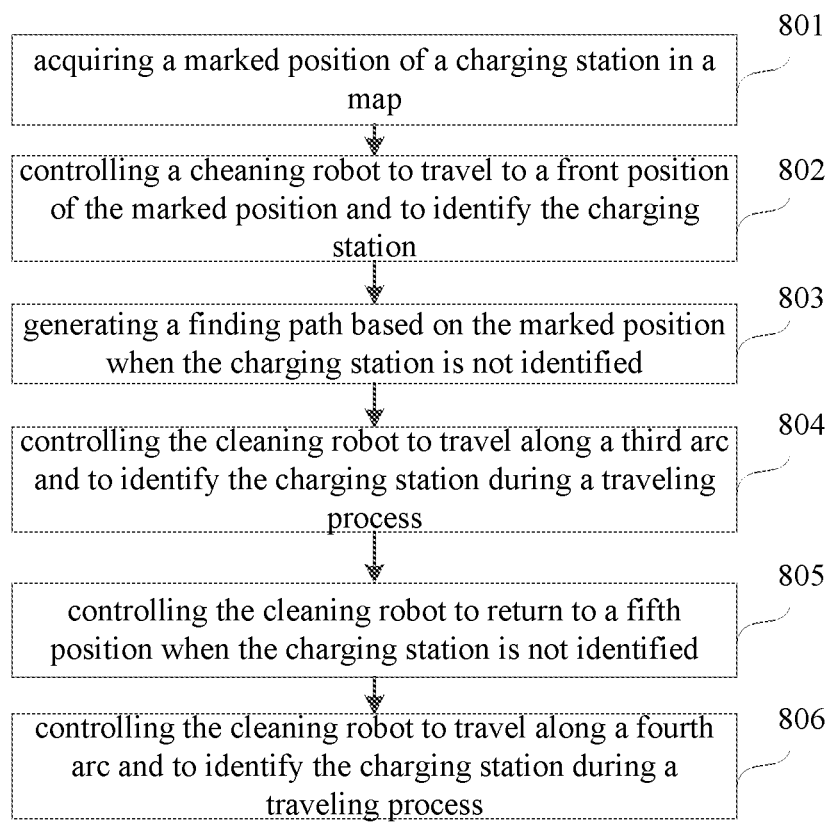
FIG. 8A is a flowchart illustrating another method for controlling a cleaning robot according to some embodiments of the present disclosure.

FIG. 8A is a flowchart illustrating a method for controlling a cleaning robot provided according to some other embodiments. The method for controlling a cleaning robot can include the following operations.

In block 801, the marked position of the charging station in the map is acquired.

The map is drawn by the cleaning robot.

Details of this block are described in detail in descriptions of the block 601, which are not elaborated herein.

In block 802, the cleaning robot is controlled to travel to the front position of the marked position and to identify the charging station.

Details of this block are described in detail in descriptions of the block 601, which are not elaborated herein.

In block 803, when the charging station is not identified, the finding path is generated based on the marked position.

In block 804, the cleaning robot is controlled to travel along a third arc and to identify the charging station during the traveling process.

The third arc is defined by taking the marked position as a circle center and taking a first predetermined distance as the radius. The third arc passes through both a fourth position and a fifth position. The fourth arc is at the first predetermined distance from the marked position along the first direction. The fifth position is at the first predetermined distance from the marked position in front of the marked position.

The front of the marked position refers to a direction where the marked position faces to the cleaning robot.

The first predetermined distance is determined according to a visible distance of the cleaning robot. In some embodiments, the first predetermined distance is an optimum visible distance of the cleaning robot. The optimum visible distance of the cleaning robot refers to a range where the cleaning robot is able to accurately determine whether the retroreflective light pattern is the retroreflective light pattern of the charging station. For example, when the optimum visible distance of the cleaning robot is 0.5 meter, the first predetermined distance is 0.5 meter.

Figure 8B:
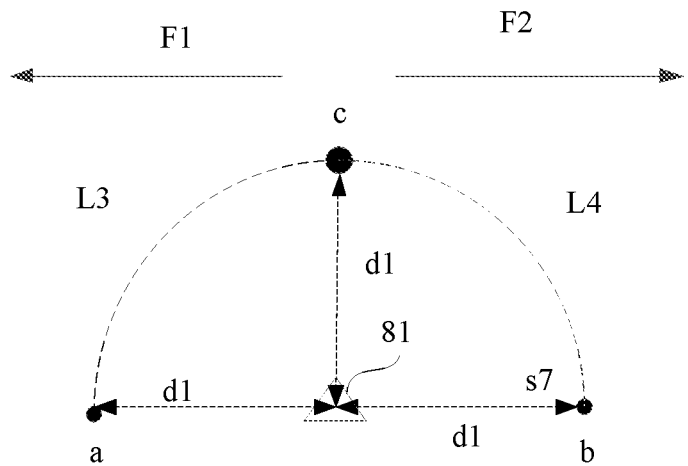
FIG. 8B is a schematic diagram illustrating an implementation of a method for controlling a cleaning robot according to some embodiments of the present disclosure.

For example, as illustrated in FIG. 8B, the first direction is direction F1, the second direction is direction F2, the marked position of the charging station is position 81, the fourth position is point a, the distance between the fourth position (point a) and the marked position 81 along the first direction is the first predetermined distance d1, the fifth position is point c, the fifth position (point c) is in front of the marked position 81, the distance between the fifth position (point c) and the marked position 81 is the first predetermined distance d1, the arc L3 is defined by taking the marked position 81 as the circle center and taking the first predetermined distance d1 as the radius. The arc L3 is determined as the third arc. The cleaning robot travels along the second arc L3 and identifies the charging station during the traveling process.

When the charging station is identified, the cleaning robot is controlled to travel to the charging station for charging. When the charging station is not identified during the traveling process along the third arc, a block 805 is executed.

In block 805, when the charging station is not identified, the cleaning robot is controlled to return to the fifth position.

In some embodiments, the cleaning robot is controlled to return to the fifth position along the third arc. Or, the cleaning robot is controlled to return to the fifth position along other traveling paths. For example, the cleaning robot is controlled to return to the fifth position along a connection line between a position where the cleaning robot is current located and the front position.

In block 806, the cleaning robot is controlled to travel along the fourth arc and to identify the charging station during the traveling process.

The fourth arc is defined by taking the marked position as the circle center and taking the first predetermined distance as the radius. The fourth arc passes through both the fifth position and a sixth position.

The first predetermined distance is determined according to a visible distance of the cleaning robot. The fifth position is at the first predetermined distance from the marked position in front of the marked position. The sixth position is at the first predetermined distance from the marked position along the second direction.

The first direction is opposite to the second direction.

For example, as illustrated in FIG. 8B, the first direction is direction F1, the second direction is direction F2, the marked position of the charging station is position 81, the sixth position is point b, the distance between the sixth position (point b) and the marked position 81 along the second direction is the first predetermined distance d1, the fifth position is point c, the fifth position (point c) is in front of the marked position 81, the distance between the fifth position (point c) and the marked position 81 is the first predetermined distance d1, the arc L4 is defined by taking the marked position 81 as the circle center and taking the first predetermined distance d1 as the radius. The arc L4 is determined as the fourth arc. The cleaning robot travels along the fourth arc L4, and identifies the charging station during the traveling process.

When the charging station is identified, the cleaning robot is controlled to travel to the charging station for charging. When the charging station is not identified, other strategies are executed, for example activating an alarm mechanism or finding the charging station along other traveling paths.

For example, when the charging station is placed against the wall and the charging station is rotated by a degree greater than 90° (i.e., the retroreflective light pattern region of the charging station is faced to the wall), the cleaning robot is unable to acquire the retroreflective light pattern of the charging station during the traveling process along the finding path. As a result, the robot is unable to identify the charging station. Therefore, the cleaning robot makes beeps to prompt the user for manual intervention.

As such, with the method for controlling a cleaning robot provided in embodiments of the present disclosure, the cleaning robot travels to the front position of the marked position of the charging station in the map. When the charging station is not identified, the finding path is generated based on the marked position. The cleaning robot is controlled to travel according to the finding path and to identify the charging station during the traveling process. A problem that the cleaning robot cannot find the charging station and cannot perform a charging-station-returning operation due to a difference between an actual position and the marked position included in the map may be solved, thereby improving intelligence of the cleaning robot and reducing manual intervention.

In addition, by controlling the cleaning robot to travel along the third arc and/or the fourth arc, when the charging station is moved in rotation, a possibility that the cleaning robot automatically finds the charging station may be improved.

Figure 9A:
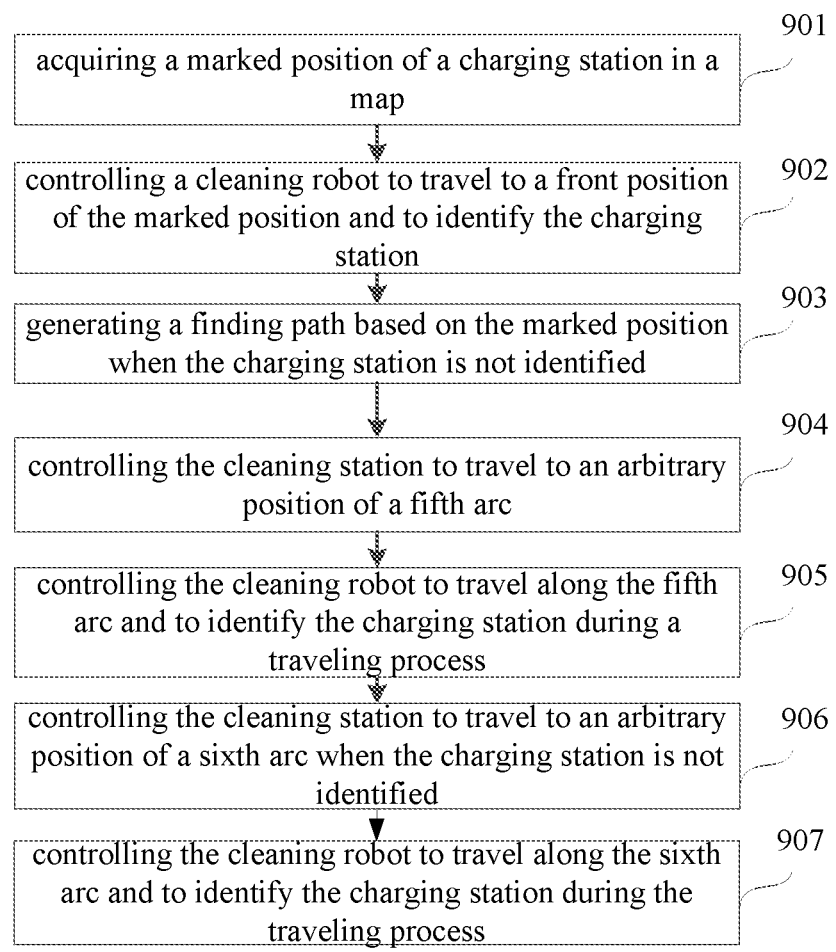
FIG. 9A is a flowchart illustrating another method for controlling a cleaning robot according to some embodiments of the present disclosure.

FIG. 9A is a flowchart illustrating a method for controlling a cleaning robot provided in some other embodiments. The method for controlling a cleaning robot includes the followings.

In block 901, the marked position of the charging station in the map is acquired.

The map is drawn by the cleaning robot.

Details of this block are described in detail in descriptions of the block 601, which are not elaborated herein.

In block 902, the cleaning robot is controlled to travel to the front position of the marked position and to identify the charging station.

Details of this block are described in detail in descriptions of the block 601, which are not elaborated herein.

In block 903, when the charging station is not identified, the finding path is generated based on the marked position.

In block 904, the cleaning robot is controlled to travel to an arbitrary position of the fifth arc.

The fifth arc is defined by taking a seventh position as the circle center and taking the first predetermined distance as the radius. The fifth arc passes through each of an eighth position, a ninth position and a tenth position.

The first predetermined distance is determined according to a visible distance of the cleaning robot. In some embodiments, the first predetermined distance is an optimum visible distance of the cleaning robot. The optimum visible distance of the cleaning robot refers to a range where the cleaning robot may accurately determine whether the retroreflective light pattern is the retroreflective pattern of the charging station. For example, when the optimum visible distance of the cleaning robot is 0.5 meter, the first predetermined distance is 0.5 meter.

The seventh position is at a second predetermined distance from the marked position along the first direction. The eighth position and the seventh position are separated by the first predetermined distance along the first direction. The ninth position and the seventh position are separated by the first predetermined distance along the second direction. The tenth position is at the first predetermined distance from the seventh position in front of the seventh position. The first distance is opposite to the second direction.

The second predetermined distance is a maximum distance that the charging station is able to move. The maximum distance that the charging station is able to move depends to a length of a power wire of the charging station. For example, the second predetermined distance is the length of the power wire of the charging station, and the second predetermined distance is 1 meter.

The front refers to a direction where the marked position faces to the cleaning robot.

Figure 9B:
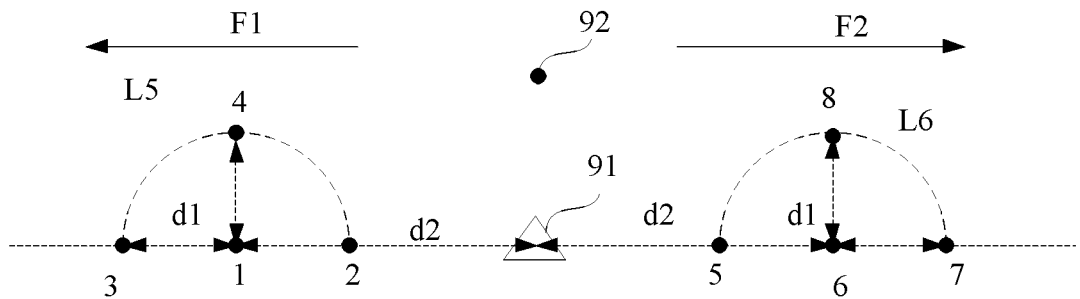
FIG. 9B is a schematic diagram illustrating an implementation of a method for controlling a cleaning robot according to some embodiments of the present disclosure.

For example, as illustrated in FIG. 9B, the first direction is direction F1, the second direction is direction F2, the marked position of the charging station is 91, the seventh position is point 1, the distance between the seventh position (point 1) and the marked position 91 along the first direction is the second predetermined distance d2, the eighth position is point 2, the distance between the eighth position (point 2) and the seventh position (point 1) along the first direction is d1, the ninth position is point 3, the distance between the ninth position (point 3) and the seventh position (point 1) along the second direction is d1, the tenth position is point 4, the tenth position (point 4) is in front of the seventh position (point 1), the distance between the tenth position (point 4) and the seventh position (point 1) is d1, the arc L5 (i.e., the fifth arc) is defined by taking the seventh distance (point 1) as the circle center and taking d1 as the radius. When the cleaning robot is located at the position 92, the cleaning robot is controlled to an arbitrary position of the arc L5.

In block 905, the cleaning robot is controlled to travel along the fifth arc and to identify the charging station during the traveling process.

When the charging station is identified, the cleaning robot is controlled to travel to the charging station for charging. When the charging station is not identified during the traveling process along the fifth arc, a block 906 is executed.

In block 906, when the charging station is not identified, the cleaning robot is controlled to an arbitrary position of a sixth arc.

When the charging station is not identified by the cleaning robot during the traveling process along the fifth arc, the cleaning robot is controlled to travel to the arbitrary position of the sixth arc from the fifth arc.

The sixth arc is defined by taking an eleventh position as the circle center and taking the first predetermined distance as the radius. The sixth arc passes through each of a twelfth position, a thirteenth position and a fourteenth position.

The eleventh position is at the second predetermined distance from the marked position along the second direction. The twelfth position is at the first predetermined distance from the eleventh position along the first direction. The thirteenth position is at the first predetermined direction from the eleventh position along the second direction. The first direction is opposite to the second direction.

For example, as illustrated in FIG. 9B, the first direction is direction F1, the second direction is direction F2, the marked position of the charging station is 91, the seventh position is point 1, the eleventh position (point 6) is at the second predetermined distance d2 from the marked position 91 along the second direction, the twelfth position is point 5, the distance between the twelfth position 5 and the eleventh position (point 6) along the first direction is d1, the thirteenth position is point 7, the distance between the thirteenth position (point 7) and the eleventh position (point 6) along the second direction is d1, the fourteenth position is point 8, the fourteenth position (point 8) is in front of the eleventh position (point 6), the distance between the eleventh position (point 6) and the fourteenth position (point 8) is d1, and an arc L6 (i.e., the sixth arc) is defined by taking the eleventh position (point 6) as the circle center and taking d1 as the radius. The cleaning robot is controlled to travel to the arbitrary position of the arc L6 from the fifth arc.

In block 907, the cleaning robot is controlled to travel along the sixth arc and to identify the charging station during the traveling process.

When the charging station is identified, the cleaning robot is controlled to travel to the charging station for charging. When the charging station is not identified, other strategies are executed, for example, activating an alarm mechanism or finding the charging station along other traveling paths.

Therefore, with the method for controlling a cleaning robot provided in embodiments of the present disclosure, the cleaning robot travels to the front position of the marked position of the charging station in the map. When the charging station is not identified, the finding path is generated based on the marked position. The cleaning robot is controlled to travel according to the finding path and to identify the charging station during the traveling process. A problem that the cleaning robot cannot find the charging station and cannot perform a charging-station-returning operation due to a difference between an actual position and the marked position included in the map can be solved, thereby improving intelligence of the cleaning robot and reducing manual intervention.

In addition, by controlling the cleaning robot to travel along the fifth arc and/or along the sixth arc, when the charging station is moved in rotation, a possibility that the cleaning robot automatically finds the charging station may be improved.

Figure 10A:
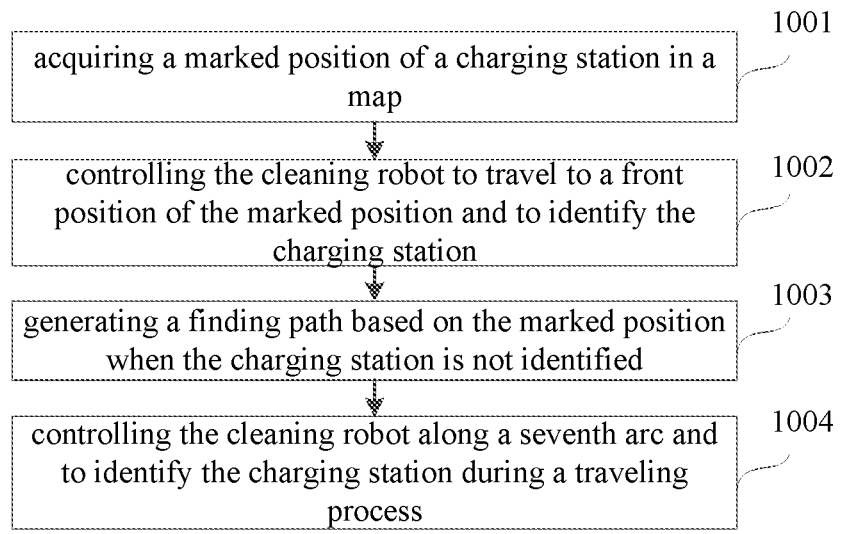
FIG. 10A is a flowchart illustrating another method for controlling a cleaning robot according to some embodiments of the present disclosure.

FIG. 10A is a flowchart illustrating a method for controlling a cleaning robot provided in some other embodiments. The method for controlling a cleaning robot includes the followings.

In block 1001, the marked position of the charging station in the map is acquired.

The map is drawn by the cleaning robot.

Details of this block are described in detail in descriptions of the block 601, which are not elaborated herein.

In block 1002, the cleaning robot is controlled to travel to the front position of the marked position and to identify the charging station.

Details of this block are described in detail in descriptions of the block 1001, which are not elaborated herein.

In block 1003, when the charging station is not identified, the finding path is generated based on the marked position.

In block 1004, the cleaning robot is controlled to travel along the seventh arc and to identify the charging station during the traveling process.

When the cleaning robot is not at the seventh arc, the cleaning robot is controlled to travel to an arbitrary of the seventh arc and travel along the seventh arc to identify the charging station during the traveling process.

The seventh arc is defined by taking the marked position as the circle center and taking the third predetermined distance as the radius. The seventh arc passed through each of a fifteenth position, a sixteenth position and a seventeenth position. The third predetermined distance is determined according to a visible distance of the cleaning robot and a movable distance of the charging station. The fifteenth position is at the third predetermined distance from the marked position along the first direction. The sixteenth position is at the third predetermined distance from the marked position along the second direction. The seventeenth position is at the third predetermined distance from the marked position in front of the marked position. The first direction is opposite to the second direction.

In some embodiments, the third predetermined distance is determined according to an optimum visible distance of the cleaning robot and a maximum distance that the charging station is able to move. For example, when the optimum visible distance of the cleaning robot is 0.5 meter and the maximum distance that the charging station is able to move is a length of a power wire of the charging station, such as 1 meter, the third predetermined distance is 1.5 meter.

The front of the marked position is a direction where the marked position is faced to the cleaning robot.

Figure 10B:
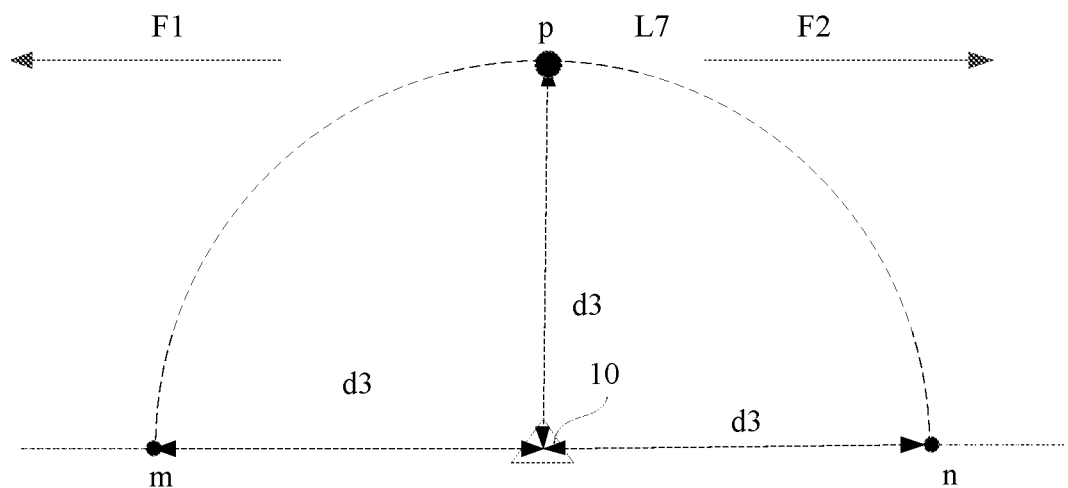
FIG. 10B is a schematic diagram illustrating an implementation of a method for controlling a cleaning robot according to some embodiments of the present disclosure.

For example, as illustrated in FIG. 10B, the first direction is direction F1, the second direction is direction F2, the marked position of the charging station is 10, the fifteenth position is point m, the distance between the fifteenth position (point m) and the marked position 10 along the first direction is the third predetermined distance d3, the sixteenth position is point n, the distance between the sixteenth position (point n) and the marked position (point n) along the second direction is d3, the seventeenth position is point p, the seventh position (point p) is in front of the marked position (point 10), the distance between the seventeenth position (point p) and the marked position (point 10) is d3, and an arc L7 (i.e., the seventh arc) is defined by taking the marked position (point 10) as the circle center and taking d3 as the radius. The cleaning robot is controlled to travel along the arc L7 and to identify the charging station during the traveling process.

When the charging station is identified, the cleaning robot is controlled to travel to the charging station for charging. When the charging station is not identified, other strategies are executed, for example, activating an alarm mechanism, or finding the charging station along other traveling paths.

As such, with the method for controlling a cleaning robot provided in embodiments of the present disclosure, the cleaning robot travels to the front position in front of the marked position of the charging station in the map. When the charging station is not identified, the finding path is generated based on the marked position. The cleaning robot is controlled to travel according to the finding path and to identify the charging station during the traveling process. A problem that the cleaning robot cannot find the charging station and cannot perform a charging-station-returning operation due to a difference between an actual position and the marked position included in the map may be solved, thereby improving intelligence of the cleaning robot and reducing manual intervention.

In addition, by controlling the cleaning robot to travel along the seventh arc, when the charging station is moved in rotation, a possibility that the cleaning robot automatically finds the charging station may be improved.

It is noted that, the method for controlling a cleaning robot illustrated as FIGS. 6A, 7A, 8A, 9A and 10A may be combined in any manners to generate a new method for controlling a cleaning robot. For example, any two embodiments above-mentioned may be combined as a new embodiment, i.e., a combination of FIG. 6A and FIG. 7A, a combination of FIG. 6A and FIG. 8A, a combination of FIG. 6A and FIG. 9A, a combination of FIG. 6A and FIG. 10A, a combination of FIG. 7A and FIG. 8A, a combination of FIG. 7A and FIG. 9A, a combination of FIG. 7A and FIG. 10A, a combination of FIG. 8A and FIG. 9A, a combination of FIG. 8A and FIG. 10A, and a combination of FIG. 9A and FIG. 10A. In some embodiments, any three embodiments above-mentioned may be combined as a new embodiment, i.e., a combination of FIGS. 6A, 7A and 8A, a combination of FIGS. 6A, 7A and 9A, a combination of FIGS. 6A, 7A and 10A, a combination of FIGS. 7A, 8A and 9A, a combination of FIGS. 7A, 8A and 10A, and a combination of FIGS. 8A, 9A and 10A. In some embodiments, any four embodiments above-mentioned may be combined as a new embodiment, i.e., a combination of FIGS. 6A, 7A, 8A and 9A, a combination of FIGS. 6A, 7A, 9A and 10A, a combination of FIGS. 6A, 7A, 8A and 10A, and a combination of FIGS. 7A, 8A, 9A and 10A. In some embodiments, five embodiments above-mentioned may be combined as a new embodiment, i.e., a combination of FIGS. 6A, 7A, 8A, 9A, and 10A. After the new embodiment is obtained, orders of blocks may be set in advance, which is not elaborated herein.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "one implementation," "some embodiments," "some implementations," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

The features disclosed herein may be implemented as part of a smart home or a smart office design, which may implement individually or integrally various electronic devices in a home or office. For example, control or display functions described above may be realized on a mobile terminal such as a smart phone, or on a smart television Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Therefore, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures

What is claimed is:

1. A cleaning robot, comprising:
a controller, configured to:
acquire a marked position of a charging station in a map;
control the cleaning robot to travel to a front position of the marked position and to identify the charging station;
generate a finding path based on the marked position when the charging station is not identified; and
control the cleaning robot to travel according to the finding path and to identify the charging station during a traveling process;
wherein, the controller is configured to:
determine that the charging station is identified when a pattern received by the cleaning robot conforms to a pattern of the charging station; wherein lights emitted by the cleaning robot are reflected by a pattern region of the charging station, and the pattern received by the cleaning robot is determined based on lights reflected off the pattern region of the charging station;
wherein the controller is further configured to:
acquire the marked position of the charging station in the map when the charging station is displaced with respect to the marked position; or
acquire marked positions of a plurality of charging stations in the map when the cleaning robot detects the plurality of charging stations during a cleaning process and distances between the marked positions of every two from the plurality of charging stations are less than a preset value.

2. The cleaning robot according to claim 1, wherein the controller is further configured to:
control the cleaning robot to travel a first distance along a first direction and to identify the charging station during the traveling process;
control the cleaning robot to return to the front position of the marked position when the charging station is not identified; and
control the cleaning robot to travel a second distance along a second direction and to identify the charging station during the traveling process.

3. The cleaning robot according to claim 1, wherein intensities of lights reflected off the pattern are different in different parts.

4. The cleaning robot according to claim 3, wherein an image sensor is configured to generate a reflective light pattern.

5. The cleaning robot according to claim 4, wherein lights reflected off a region form bright points on the image sensor, while lights reflected off another region form dark points on the image sensor;
wherein a light point with a brightness value higher than a predetermined brightness value is called as a bright point, a light point with a brightness value lower than the predetermined brightness value is called as a dark point.

6. The cleaning robot according to claim 1, wherein a difference between a horizontal coordinate of the front position and a horizontal coordinate of the marked position is less than a predetermined value, and a longitudinal coordinate of the front position is greater than a longitudinal coordinate of the marked position.

7. A method for controlling a cleaning robot, comprising:
acquiring a marked position of a charging station in a map;
controlling the cleaning robot to travel to a front position of the marked position and identifying the charging station;
generating a finding path based on the marked position when the charging station is not identified; and
controlling the cleaning robot to travel according to the finding path and identifying the charging station during a traveling process;
wherein, the identifying the charging station comprises,
determining that the charging station is identified when a pattern received by the cleaning robot conforms to a pattern of the charging station; wherein lights emitted by the cleaning robot are reflected by a pattern region of the charging station, and the pattern received by the cleaning robot is determined based on lights reflected off the pattern region of the charging station;

wherein said acquiring the marked position of the charging station in the map comprises:

acquiring the marked position of the charging station in the map when the charging station is displaced with respect to the marked position; or acquiring marked positions of a plurality of charging stations in the map when the cleaning robot detects the plurality of charging stations during a cleaning process and distances between the marked positions of every two from the plurality of charging stations are less than a preset value.

8. The method according to claim 7, wherein the controlling the cleaning robot to travel according to the finding path and identifying the charging station during the traveling process comprises:

controlling the cleaning robot to travel a first distance along a first direction and identifying the charging station during the traveling process;

controlling the cleaning robot to return to the front position of the marked position when the charging station is not identified; and controlling the cleaning robot to travel a second distance along a second direction and identifying the charging station during the traveling process.

9. The method according to claim 7, wherein an image sensor is configured to generate a reflective light pattern.

10. The method according to claim 9, wherein lights reflected off a region form bright points on the image sensor, while lights reflected off another region form dark points on the image sensor;

wherein a light point with a brightness value higher than a predetermined brightness value is called as a bright point, a light point with a brightness value lower than the predetermined brightness value is called as a dark point.

11. The method according to claim 7, wherein determining that the charging station is identified when a pattern received by the cleaning robot conforms to the pattern of the charging station comprises:

identifying whether a retroreflective light pattern received by the cleaning robot conforms to a retroreflective light pattern of the charging station; and determining that the charging station is identified when the retroreflective light pattern received by the cleaning robot conforms to the retroreflective light pattern of the charging station.

12. The method according to claim 7, wherein a difference between a horizontal coordinate of the front position and a horizontal coordinate of the marked position is less than a predetermined value, and a longitudinal coordinate of the front position is greater than a longitudinal coordinate of the marked position.

13. A cleaning robot, comprising:

a controller;

a sensor carried by the cleaning robot, configured to detect light patterns of a charging station;

wherein the controller is configured to:

acquire a marked position of a charging station in a map;

control the cleaning robot to travel to a front position of the marked position and to identify the charging station;

generate a finding path based on the marked position when the charging station is not identified; and control the cleaning robot to travel according to the finding path and to identify the charging station during a traveling process;

wherein, the controller is configured to:

based on the light received by the sensor, determine whether the charging station is identified;

wherein the controller is further configured to:

acquire the marked position of the charging station in the map when then charging station is displaced with respect to the marked position; or acquire marked positions of a plurality of charging stations in the map when the cleaning robot detects the plurality of charging stations during a cleaning process and distances between the marked positions of every two from the plurality of charging stations are less than a preset value.

14. The cleaning robot according to claim 13, wherein the controller is further configured to:

control the cleaning robot to travel a first distance along a first direction and to identify the charging station during the traveling process;

control the cleaning robot to return to the front position of the marked position when the charging station is not identified; and control the cleaning robot to travel a second distance along a second direction and to identify the charging station during the traveling process.

15. The cleaning robot according to claim 13, wherein intensities of lights reflected off the pattern are different in different parts.

16. The cleaning robot according to claim 15, wherein an image sensor generates a reflective light pattern.

17. The cleaning robot according to claim 16, wherein lights reflected off a region form bright points on the image sensor, while lights reflected off another region form dark points on the image sensor;

wherein a light point with a brightness value higher than a predetermined brightness value is called as a bright point, a light point with a brightness value lower than the predetermined brightness value is called as a dark point.

* * * * *